United States Patent [19]
Curtis et al.

[11] Patent Number: 5,158,589
[45] Date of Patent: Oct. 27, 1992

[54] LATHE SYSTEM AND METHODOLOGY

[75] Inventors: Daniel W. Curtis; Donnie J. Heinzen; Guadalupe T. Luna, all of Houston, Tex.

[73] Assignee: Texas Instruments Incorporated, Dallas, Tex.

[21] Appl. No.: 807,294

[22] Filed: Dec. 13, 1991

[51] Int. Cl.⁵ .............................................. C03B 29/00
[52] U.S. Cl. ........................................ 65/57; 65/59.28; 65/109; 65/138; 65/154; 65/279; 228/44.5; 279/123
[58] Field of Search .................. 65/57, 59.28, 59.33, 65/109, 138, 152, 155, 154, 278, 279; 228/44.5, 265, DIG. 902; 279/123

[56] References Cited

U.S. PATENT DOCUMENTS

| | | | |
|---|---|---|---|
| 1,436,825 | 11/1922 | Sanford | 65/374.15 X |
| 2,151,840 | 3/1939 | Dichter | 65/109 X |
| 2,306,054 | 12/1942 | Guyer | 65/57 X |
| 2,359,501 | 10/1944 | White | 65/374.15 X |
| 2,452,652 | 11/1948 | Hansen | 65/138 X |
| 3,116,934 | 1/1964 | Drees et al. | 65/59.28 X |
| 4,923,498 | 5/1990 | Gregory | 65/109 |

Primary Examiner—Robert L. Lindsay
Attorney, Agent, or Firm—W. James Brady, III; B. Peter Barndt; Richard L. Donaldson

[57] ABSTRACT

One method of the present invention provides a method of connecting a flange to a cylinder. This method includes securing the cylinder in a first chuck of a lathe and securing the flange in a second chuck of the lathe. The method also includes rotating the first and second chuck such that the cylinder and flange are rotated while bringing an end of the cylinder and the flange in proximity of a heating element associated with the lathe contemporaneously with the rotating step. Finally, there is the step of bringing the end of the cylinder in contact with the flange. Novel apparatus consistent with the present invention are also disclosed.

39 Claims, 2 Drawing Sheets

LATHE SYSTEM AND METHODOLOGY

TECHNICAL FIELD OF THE INVENTION

This invention relates in general to lathe technology, and more particularly to an improved lathe system and methodology operable to accommodate applications involving very high temperatures.

BACKGROUND OF THE INVENTION

Lathe technology has been used in many applications, and typically involves a machine on which a workpiece such as wood, metal, glass or other material is spun and shaped by either hand or tool. As a result, various different lathe systems exist for accommodating different types of materials and performing different types of operations. In particular, in the field of glass shaping and glass blowing, various types of lathes have been developed in order to perform various different operations in shaping and/or building glass devices. These lathe systems typically include a pair of chucks disposed at opposite ends of the lathe and which are adjustable in order to hold glass devices between the two chucks. In addition, a heating element is moveable between the two chucks for heating the glass somewhere along its longitudinal axis such that the glass may be shaped as is desired for the particular application. Further, the chucks may be rotated, thereby rotating the glass structure connected between the two chucks. This rotation causes a uniform area of heat from the heating element to be applied to the rotating glass in the area adjacent the heating element.

The lathe systems available in the prior art, however, have certain limitations. One key limitation arises from the use, or attempted use, of increased temperatures from the heating element. In particular, increased temperatures may have adverse consequences on various components of the lathe. One particular example is the limited amount of heat that prior art chuck inserts can withstand. More particularly, certain applications requiring high temperatures have until the present invention been impossible to perform using a lathe because the chuck inserts would fail (e.g. melt and/or break), thereby preventing the use of the lathe.

Another limitation arises when an increased temperature application is combined with an increased weight of the device being held by the lathe chucks. For example, if a particular glass application involves a relatively heavy piece of glass, and also requires large temperatures from the heating element, the operation of the lathe may become inaccurate and/or unsafe. In particular, as the lathe is rotated and the temperature of the heating element is increased, the glass device held by the chucks transmits a great deal of this increased temperature to the chucks themselves. Still further, the chucks may also be brought into close proximity with the heating element, thereby directly exposing them to the increased heat. The chuck systems currently existing in the prior art, however, are incapable of withstanding temperatures above a certain limit. As a result, the glass member held by the chucks may not be properly supported and, therefore, the desired operation on the glass member may become very difficult to achieve. Indeed, for temperatures above a certain range, it has been impossible to use the prior art lathe systems because the components of the chucks are simply unable to withstand the temperature and, therefore, are unable to properly support the glass member held by the chucks.

One very troubling example of the above limitations arises in the process of fusing a flange onto a cylindrical quartz tube. In order to bond the flange to the tube using a lathe system, a temperature on the order of 1700° C. would be necessary. The prior art lathe systems, however, utilize chuck components made of either transite or stainless steel. Neither of these materials is capable of withstanding the 1700° C. temperatures and, therefore, the lathe system has been unusable for purposes of fusing the flange onto the quartz tube. In particular, a transite material in the chuck system would burn and contract and, therefore, could release the glass tube, thereby causing severe damage to the tube and creating a very dangerous atmosphere. Alternatively, the use of a stainless steel chuck system in this high temperature environment would cause the stainless steel to expand due to the increased temperature, and would likely cause the quartz tube to break. Therefore, this too is an unusable solution and a dangerous approach. Further, in each instance the increased likelihood of damage to the quartz tube is also reflected as an increased cost in the fusing of flanges onto glass tubes.

As a result of the limitations of the prior art, in certain applications where extremely high heat levels are used in combination with the formation of glass structures, persons skilled in the art have been forced to manually work with the glass rather than being able to use the lathe system at all. In particular, one attempted solution in the prior art required an operator to manually fuse a flange onto a quartz tube. Thus, some type of device was required in order to hold the flange immediately abutting the tube while the operator fused the flange to the tube by hand. This approach, however, has numerous limitations. For example, this technique requires a great deal of time in performing the various steps to accomplish the purpose of attaching the flange to the tube. In particular, first the flange must be positioned immediately next to the tube. Second, a quartz fuse rod must be used to run or tack a bead of quartz between the flange and the tube. Third, the bead has to be fused again in order to seal the flange to the tube. Obviously, this multi-step process requires a great deal of time and resources. As yet another limitation, the above-stated tacking and fusing steps may only be performed over a circumferential distance on the order of two inches. Many tubes have circumferences on the order of 8 to 14 inches and, therefore, this limitation requires a large expenditure of time. If the operator attempts to go beyond this approximate two inch limitation, there is an increased likelihood that either the tube or flange would be destroyed and, therefore, the entire process would have to be recommenced. In addition, the destruction of either the tube or the flange may be dangerous, and has obvious economic consequences as well.

Therefore, a need has arisen for an improved lathe system and methodology which permits operation in increased temperature applications and minimizes the time and expense incurred in performing the desired operation.

SUMMARY OF THE INVENTION

In accordance with the present invention, an improved lathe system and methodology are provided which substantially eliminate or reduce disadvantages and problems associated with prior glass bonding techniques.

For example, one method of the present invention provides a method of connecting a flange to a cylinder. This method includes securing the cylinder in a first chuck of a lathe and securing the flange in a second chuck of the lathe. The method also includes rotating the first and second chuck such that the cylinder and flange are rotated while bringing an end of the cylinder and the flange in proximity of a heating element associated with the lathe contemporaneously with the rotating step. Finally, there is the step of bringing the end of the cylinder in contact with the flange.

The present invention provides numerous technical advantages. For example, one technical advantage of the present invention is the ability to use an improved lathe system in order to efficiently and accurately attach a flange to a tube member in a reduced amount of time. Therefore, there are the additional advantages of the reduced cost to manufacture the completed device and the ability to increase production of these devices to a much larger scale. Another technical advantage is an extremely reduced risk of damage to either the tube or the flange and, therefore, there is a significant reduction in the cost of manufacture of the completed device. Yet another technical advantage is the improvement in safety concerns due to the reduced possibility of glass breakage. Still other technical advantages are readily apparent from the embodiments discussed below.

BRIEF DESCRIPTION OF THE DRAWINGS

For a more complete understanding of the present invention and the advantages thereof, reference is now made to the following description taken in conjunction with the accompanying drawings in which:

FIG. 1b illustrates an exploded view of the tube and flange of FIG. 1a;

FIG. 4b illustrates a graphite jaw insert for coupling to the steel insert of FIG. 4a.

DETAILED DESCRIPTION OF THE INVENTION

Figure 1A:
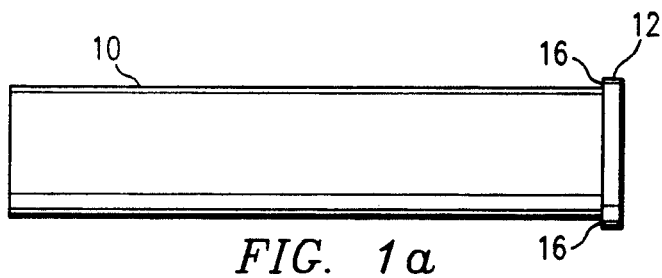
FIG. 1a illustrates a tube having a flange disposed at one end thereof.
Figure 1B:
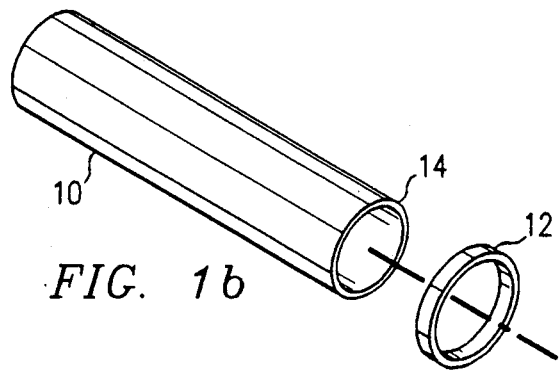

FIGS. 1a and 1b illustrate a cylindrical tube member 10 and a flange 12. FIG. 1a illustrates the desirable attachment of flange 12 to one end of tube member 10. FIG. 1b shows an exploded view to better illustrate the placement of flange 12 onto tube member 110. In particular, flange 12 is to be affixed to the end 14 of tube member 110. Tube member 10 is commonly on the order of 96 inches in length and 9 inches in diameter. Flange 12 is generally disc-shaped, and preferably has an outer diameter larger than that of tube member 10 and an inner diameter equal to that of tube member 10. Once flange 12 is disposed onto end 14 of tube member 10, flange 12 will provide a protruding rim 16. Rim 16, therefore, provides a means by which the combination of tube member 10 and flange 12 may be affixed to an accompanying device.

With the advancement of semiconductor technology, one increasingly important application of the flange/tube construction illustrated in FIGS. 1a and 1b is the formation of a quartz tube chamber which is used for purposes of manufacturing semiconductor chip devices. In particular, a structure such as that illustrated in FIG. 1a is formed where both tube member 110 and flange 12 are constructed of a quartz material. The use of a quartz material is highly desirable because it is extremely pure and virtually impenetrable by impurities. As a result, the resulting quartz device forms a chamber in which semiconductor processes may take place without interference from outside impurities or other substances. These external effects could otherwise interfere with the activities taking place inside the chamber. Thus, the quartz chamber created within the tube member gives rise to an extremely controlled environment which may be isolated from outside effects.

As semiconductor technology advances, the need for a precisely controlled environment is critical in order to keep the semiconductor process which occurs inside the chamber free from outside particles. If these particles were permitted to enter the chamber, there is an increased possibility that the semiconductor device manufactured within the chamber will not operate properly. Thus, the quartz chamber is highly preferable to perform various semiconductor manufacturing processes. In addition, the creation of a quartz chamber may be used in other processes where it is necessary or desirable that the process occurring within the chamber is highly isolated from external environmental considerations.

Although the use of quartz materials for tube member 10 and flange 12 are highly desirable, difficulties and expense have arisen in the art in attempting to efficiently and accurately affix flange 12 to end 14 of tube member 110. As discussed in greater detail below, although lathe technology has permitted the affixing of a flange to a tube for non-quartz materials, the use of quartz requires immense heat (on the order of 1700° C.) in order to soften the quartz to a fusable state so that the tube member may be properly affixed to the flange. Prior art lathe systems, however, utilize steel or transite materials which are incapable of properly supporting the glass tube member when exposed to these extreme temperatures. As a result, persons in the industry have been forced to affix the quartz flange to the quartz tube by hand.

The manual process of flange affixation may be extremely cumbersome and inefficient. Indeed, under implementation it has been found that there is an approximate probability that one in four quartz tubes will be damaged accidentally and, hence, destroyed by performing this manual technique. For example, the manual affixation of a flange to a tube requires various steps which are somewhat analogous to welding. First, the flange must be accurately held in abutment with the tube. If either the flange and/or the tube is relatively heavy, this step may be very difficult to accomplish with the precision necessary for a good seal and/or a properly shaped structure. In a second step, a quartz fuse rod is placed along the interface between the flange and tube and the rod is melted or tacked to form a bead of quartz along the interface. Third, the bead is reheated and shaped in order to fuse the flange to the tube. During the second and third steps, there is a significant likelihood that air will be trapped within the quartz bead and, therefore, subsequent excessive heating and cooling may cause that air to expand and contract, thereby cracking and destroying either the tube, the flange, or both.

From the above, it may be appreciated that the process of manually affixing a quartz flange and tube together may be extremely time consuming and inefficient. The present invention, however, provides a highly novel and beneficial solution to the drawbacks of the prior art manual technique.

Figure 2:
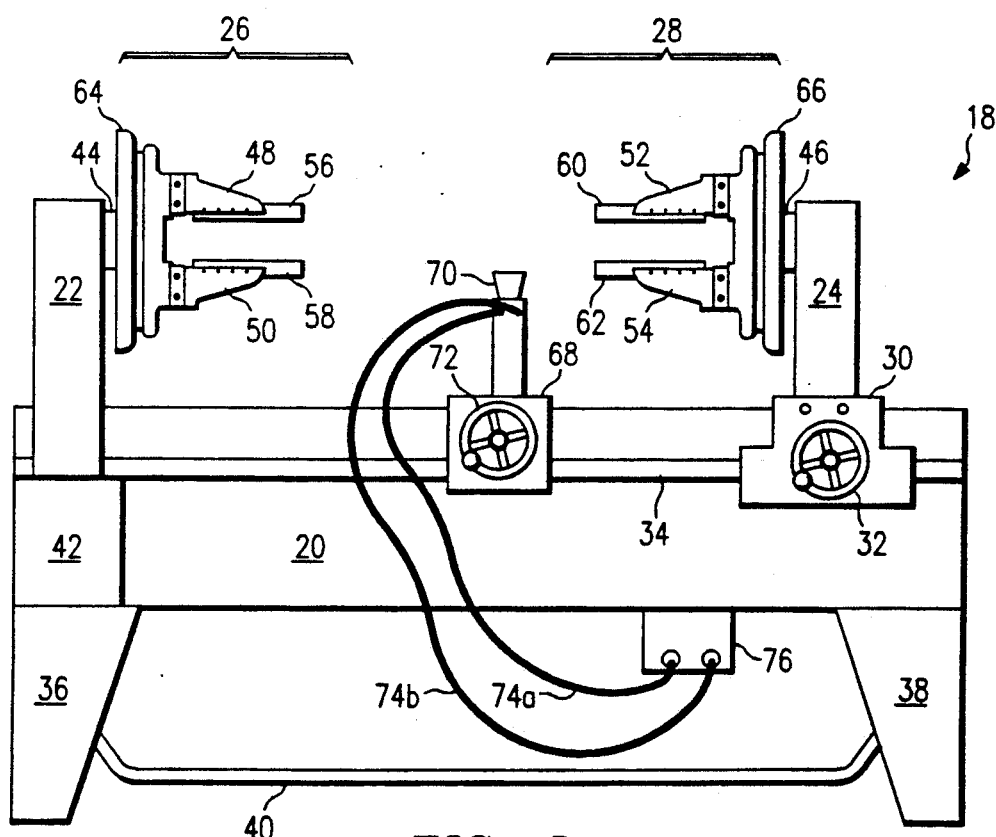
FIG. 2 illustrates a scroll chuck lathe system.

FIG. 2 illustrates a side view of a lathe 118 which is utilized in connection with the present invention. Lathe 18 includes a table 20 which supports a headstock 22 and a tailstock 24. Headstock 22 and tailstock 24 both include respective scroll chucks 26 and 28. Scroll chucks 26 and 28 are adjustable as described below such that either chuck may hold a workpiece such as glass, metal or wood.

Headstock 22 is permanently affixed to table 20, while tailstock 24 is attached to a tailstock positioning device 30. Tailstock positioning device 30 includes a crankwheel 32, which when rotated, causes tailstock positioning device 30 and tailstock 24 to move longitudinally along a track 34 formed along table 20. In other words, because tailstock 24 and scroll chuck 28 are affixed to positioning device 30, the turning of crankwheel 32 also causes those devices to move as well. As a result, it may be appreciated that scroll chuck 28 may be longitudinally advanced along table 20 either toward or away from headstock 22.

Table 20 further includes leg members 36 and 38 for supporting table 20. A foot operated switch 40 is disposed generally between leg members 36 and 38. Switch 40 may be activated in order to turn on a motor 42, which rotates a shaft 44 and, therefore, causes scroll chuck 26 to rotate. Thus, an operator using lathe 18 may cause scroll chuck 26 to rotate with the use of his or her foot and, therefore, is able to operate the device having his or her hands free for other tasks. Lathe 18 further includes a locking device (not shown) which if locked, operates such that motor 42 also rotates a shaft 46 of tailstock 24. Thus, by locking this device, both rotating shafts 44 and 46 will rotate, thereby causing both scroll chucks 26 and 28 to correspondingly rotate. Accordingly, it may be appreciated that in operation, two different pieces of material may be disposed, respectively, in scroll chucks 26 and 28 and foot operated switch 40 may be activated. In this event, both pieces of material will be rotated at the same speeds and an operator may perform any of a number of desired operations on them.

The particular components of scroll chucks 26 and 28 are as follows. Scroll chuck 26 includes three radially moveable jaws; however, in the perspective of FIG. 2 only two jaws, 48 and 50, are shown for purposes of simplifying the illustration. Generally, however, the three jaws are disposed around the circular perimeter of the scroll chuck, and are symmetrically placed 120 degrees apart from one another. While the remaining discussion generally recites only two jaws per chuck, it should be understood that a third jaw is likewise included in fact, but is eliminated only for ease of illustration. Further, the third jaw should be assumed to be equal in structure and function as to those specifically described. Scroll chuck 28 similarly includes three jaws, while only two jaws, 52 and 54, are illustrated. Each jaw of both chucks 26 and 28 has an accompanying metal insert 56 and 58, and 60 and 62, respectively. As discussed in detail below, inserts 56 and 58, and 60 and 62 are affixed within the respective jaws of respective chucks and are, therefore, also positioned and 120 degrees apart from one another.

Scroll chucks 26 and 28 include respective handwheels 64 and 66. Rotation of handwheel 64 causes jaws 48 and 50 to move radially in accordance with the direction of rotation. Thus, if handwheel 64 is rotated counter-clockwise, jaws 48 and 50 move radially outward, while rotation of handwheel 64 in a clockwise manner causes jaws 48 and 50 to move inward. Handwheel 66 operates in a like manner and, therefore, jaws 52 and 54 and their corresponding inserts move radially in accordance with the rotation of handwheel 66. Thus, it should be appreciated that by rotating either handwheel 64 or 66 clockwise, a workpiece such as a glass tube may be clamped or trapped between the inserts of the jaws of the respective scroll chuck.

Both handwheels 64 and 66 have locking devices associated with them (although not illustrated) such that, once that the corresponding jaws are in a desired position, the handwheels may be locked into that position so that inadvertent movement of the jaws and inserts is not possible. As indicated above, an operator of lathe 18 can place any desired workpiece within the inserts of an associated scroll chuck 26 or 28, and by rotating handwheel 64 and 66 can cause the member to be clamped within the respective scroll chuck. Once the jaws of the chuck are securely locked, foot operated switch 40 may be depressed in order to cause scroll chucks 26 and 28 to rotate, thereby rotating the workpieces clamped by those scroll chucks. As a result, any desired operation which requires or benefits from the rotation of those workpieces may be performed.

Lathe system 18 further includes a heating element positioning device 68. Heating element positioning device 68 supports a heating element, such as a gas burner element 70, above table 20. Heating element positioning device 68 includes a crankwheel 72 which functions similarly to crankwheel 32. Thus, by rotating crankwheel 72, an operator may cause heating element positioning device 68 and consequently, burner element 70, to move longitudinally along track 34 to any desired position. A pair of supply hoses 74a and 74b are connected to a fuel supply 76 and gas burner element 70. Fuel supply 76 provides various desired fuels for the flame of gas burner element 70 and, therefore, may provide natural gas, oxygen, hydrogen or the like. An operator of lathe 118 may move burner element 70 to any desired position between scroll chucks 26 and 28. Further, the fuel provided by gas burner element 70 may be ignited in order to apply heat to a workpiece which is grasped by either or both of scroll chucks 26 and 28. In particular, in the preferred use, hoses 74a and 74b provide respective flammable gases which are mixed in gas burner element 70. This mixture permits the extensive heat (e.g. 1700° C.) typically required to fuse quartz workpieces.

Prior to the present invention, the affixation of a quartz flange to a quartz tube, as discussed above in connection with FIGS. 1a and 1b, has not been possible with lathe 18 of FIG. 2. This application would be generally unsuccessful due to the extreme heat required to affix or "butt seal" the flange to the tube. In particular, in order to attempt this operation, tube 10 would be disposed within metal inserts 56 and 58 of scroll chuck 26 and handwheel 64 adjusted so that tube 10 is secured within scroll chuck 26. Likewise, flange 12 would be disposed between metal inserts 60 and 62, as well as the third metal insert which is not illustrated, and handwheel 66 rotated such that flange 112 is secured by scroll chuck 28. Burner positioning device 68 would be positioned such that the flames provided by the ignited fuel of burner element 70 may be applied to both end 14 of tube 10 as well as flange 12. Thus, the goal of the operation would be to heat both end 14 and flange 12 to a sufficient temperature such that the two may be brought together, thereby butt sealing, or physically and permanently coupling them to one another, in an orderly fashion.

Unfortunately, the structure depicted and described with respect to lathe 18 is by itself insufficient to accomplish the above-discussed goal. In particular, as flange 12 is moved toward burner element 70 (by moving scroll chuck 28), the excessive heat provided by burner element 70 would have extremely adverse effects on metal inserts 60 and 62 (as well as the third metal insert which is not illustrated). In particular, excessive heat on the order of 1700° C. is required to soften the quartz flange 12 and the end 14 of tube member 12. This excessive heat is far greater than the melting point of the material which is used to construct inserts 60 and 62. As stated above, insert 60 and 62 typically comprise either stainless steel or transite. In the instance of stainless steel, the excessive heat provided by burner element 70 would cause the inserts to expand and, therefore, excessively tighten their grip on flange 12. Naturally, as the inserts expand beyond an acceptable limit, they would force flange 12 to break, thereby destroying flange 12 and defeating the goal of fusing the flange to tube 10. Alternatively, the transite inserts may melt to such a large extent that they would be unable to retain the flange and, as a result, the flange would be improperly positioned in order to affix it to the tube. As an even more catastrophic result, the retaining capability of the inserts may be completely destroyed and the flange may come loose and discharge itself from the scroll chuck all together. If this were to occur during high speed rotation of lathe 18, the flange could become an extremely dangerous projectile. In the instance of a transite material used to construct inserts 60, 62 and the insert not shown, the excessive heat provided by burner element 70 would cause the transite inserts to contract. As a result, again flange 12 could possibly work itself loose and be discharged, thereby preventing the objective of attaching it to the tube and possibly creating a dangerous environment.

Figure 3:
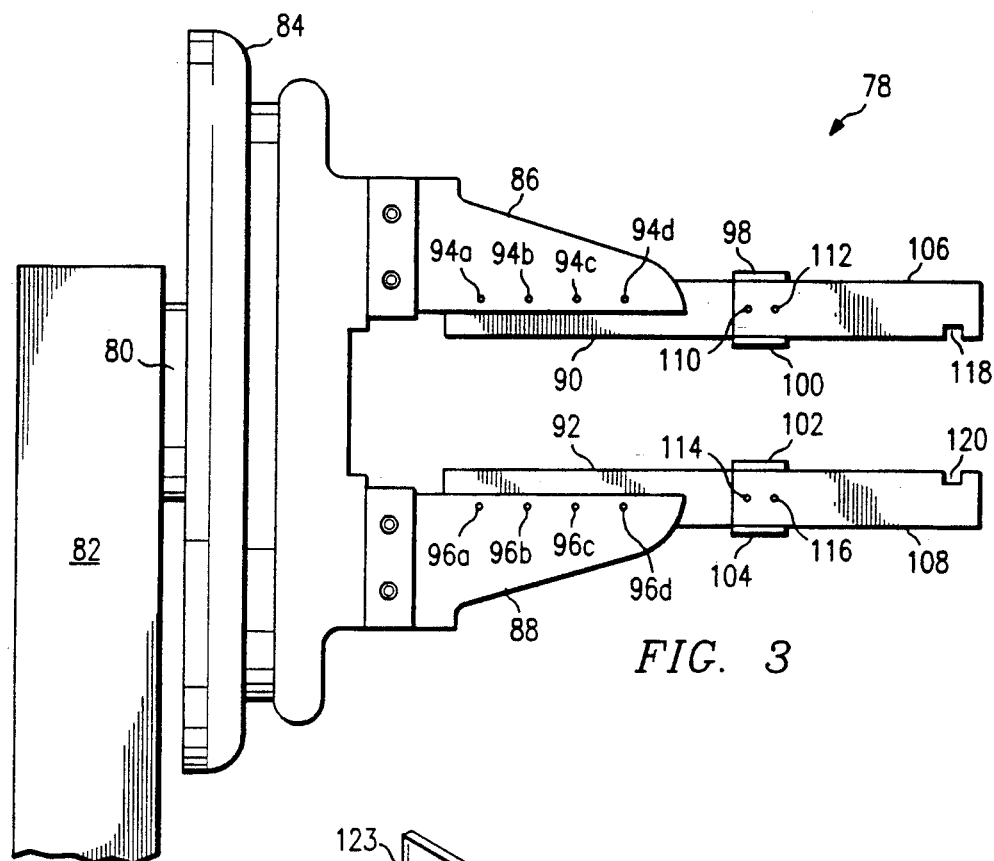
FIG. 3 illustrates a scroll chuck having graphite jaw inserts.

FIG. 3 illustrates an enlarged side view of an improved scroll chuck indicated generally at 78. For purposes of illustration, scroll chuck 78 is illustrated as connected to a rotating shaft 80, which is mechanically connected to a stock device 82. Stock device 82 may comprise either a tailstock or a headstock as exemplified in FIG. 2, above. Scroll chuck 78 further includes a handwheel 84 and a plurality of jaws 86 and 88. Again, although not illustrated, scroll chuck 78 in the preferred embodiment includes three jaws, although only two are illustrated to simplify the drawing. Further, as discussed in connection with FIGURE 2, handwheel 84 may be rotated in order to move jaws 86 and 88 (as well as the jaw not illustrated) either radially inward or outward in response to the direction of rotation of handwheel 84.

Each jaw 86 and 88 of scroll chuck 78 further includes a respective insert 90 and 92 (as well as a third insert associated with the jaw which is not illustrated). In the preferred embodiment, inserts 90 and 92 are constructed of steel. Inserts 90 and 92 are positioned within a groove or channel that is formed longitudinally along the inner surface of jaws 86 and 88, in order to securely align each insert with its respective jaw. In addition, securing screws 94a-94d and 96a-96d are threaded through jaws 86 and 88, respectively, in order to maintain pressure against inserts 90 and 92, respectively. This pressure further insures the stabilization and maintenance of the inserts within jaws 86 and 88, respectively. Inserts 90 and 92 each include a pair of perpendicular securing plates 98 and 100, and 102 and 104, respectively.

Each jaw, 86, 88 and the jaw not illustrated, also has an associated high temperature jaw insert 106 and 108 (as well as a third for the non-illustrated jaw) aligned with the respective jaw. In the preferred embodiment, high temperature jaw inserts 106 and 108 are constructed of a material capable of withstanding extremely high temperatures, and which therefore is preferably graphite. As discussed in greater detail below, each high temperature jaw insert 106 and 108 is connected to scroll chuck 78 by aligning it with the respective inserts 90 and 92, positioning it between the respective securing plates 98 and 100 or 102 and 104, and securing fastening screws 110 and 112 or 114 and 116 through the respective high temperature jaw insert. In the preferred embodiment, each high temperature jaw insert 106 and 108 also includes a square notch 118 and 120, respectively, formed near the end of the insert. Square notches 118 and 120 are formed in order to position a workpiece, such as flange 12 illustrated in FIG. 1b, securely within the high temperature jaw inserts. Thus, the particular dimensions of square notches 118 and 120 are formed in order to accommodate the particular workpiece which will be clamped within high temperature jaw inserts 106 and 108.

Scroll chuck 78 is preferably implemented in lathe 18 illustrated in FIG. 2. The inclusion of high temperature jaw inserts 106 and 108 (as well as the third insert not illustrated), however, permits lathe 18 to be effectively utilized in order to butt seal a flange to a corresponding tube. In particular, if scroll chuck 78 were substituted for scroll chuck 28 illustrated in FIG. 2, crankwheel 32 could be rotated and, hence, scroll chuck 28 could be moved toward the flame provided by burner element 70 without the problems noted above. The inclusion of high temperature jaw inserts 106 and 108 permit the flange to be brought into immediate contact with the flame provided by burner element 70 without immediate contact between inserts 90 and 92 and the high temperature flame. This insulation of contact prevents the adverse effects which may occur if using stainless steel or transite inserts as discussed above. More particularly, when bringing the flange into contact with the burner flame, only the high temperature jaw inserts 106 and 108 are brought into contact with the flame rather than directly exposing inserts 90 and 92. Thus, the extension effect of providing high temperature inserts in addition to inserts 90 and 92 spares inserts 90 and 92 from having to directly contact the flame. As a result, the effect of the high temperature flame provided by burner element 70 is substantially minimized by the inclusion of high temperature inserts as illustrated in FIG. 3.

As stated above, in the preferred embodiment the high temperature inserts comprise graphite and, therefore, is sufficient to withstand high temperatures. Indeed, graphite may be exposed to temperatures exceeding the 1700° C. necessary to bring a quartz workpiece to its softening (i.e., fusing) point. Thus, a quartz flange may be affixed within the square notches 118 and 120 of the high temperature jaw inserts, while a quartz tube is affixed in the opposing scroll chuck. Thereafter, an operator may depress foot operated switch 40 in order to commence rotation of both scroll chucks. Once sufficient heat is generated by burner element 70, both the end of the quartz tube and the side of the quartz flange may be brought into immediate contact with the flame. After sufficient time passes, both the end of the quartz tube and the side of the quartz flange will reach a sufficient softening point, and the longitudinal moveability of the scroll chuck may be adjusted in order to bring the quartz flange in contact with the end of the quartz tube. At the instance of contact, the two separate components will be butt sealed and immediately joined together as a whole.

Either immediately before and/or after the butt seal, it may also be desirable for the operator to apply a carbon rod or paddle which is cooled by liquid, such as water, to the end of the tube and/or the flange. The carbon tool prevents either the tube end or the flange from excessively deforming due to the combination of the extreme heat from the burner and the centrifugal force which is generated by the rotation of the tube and flange. Further, after the butt seal has been accomplished, the operator preferably applies a localized heat, with a torch or the like, along the interface between the flange and the tube from the inside of the tube. This localized heat completes the fusing of the inside surface of the tube and flange.

From the above it may be appreciated that with the present invention there is no need to proceed manually, and at a very slow rate such as the two inch increment which is generally required in the prior art. Further, due to the use of the lathe rather than the manual process, the overall time necessary to accurately and properly seal the flange to the tube is reduced to a time period on the order of fifteen minutes as opposed to a period in excess of an hour as is required by the manual process. In addition, the immediate seal provided by the use of the lathe as opposed to the manual process greatly reduces the probability of damaging either the flange or the tube during the sealing process. As a result, the costs and dangers associated with the process are correspondingly reduced. Still further, the use of the securing plates 98 and 100 also provides additional strength for handling relatively heavy tubes and/or flanges.

Figure 4A:
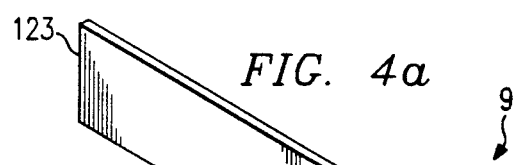
FIG. 4a illustrates a steel insert configured to accommodate a graphite jaw insert.

FIG. 4a illustrates an enlarged three dimensional view of insert 90 illustrated in FIG. 3, above. By way of example and for purposes of illustrating the best mode of the invention, the preferred dimensions of each of the various components of insert 90 are stated below; however, it should be understood that these dimensions may be modified by one skilled in the art without departing from the scope of the intended invention. Insert 90 includes a central member 122, and a pair of perpendicular securing plates 98 and 100 disposed in an I-beam type fashion at an end 124 of central member 122. In the preferred embodiment, central member 122 is 12 inches in length, 2 inches in height and 0.25 inches in depth. Each perpendicular securing plate 98 and 100 is 3 inches in length, 1 inch in height and 0.25 inches in depth. Perpendicular securing plates 98 and 100 are preferably attached to insert 90 by welding. As more readily appreciated in connection with FIG. 4b below, perpendicular securing plates 98 and 100 provide vertical stability for coupling to the high temperature jaw insert illustrated in FIG. 4b below. End 123 of central member 122 is positioned toward a jaw member as illustrated in FIG. 3, above. In particular, in the preferred embodiment central member 122 is disposed within a longitudinal notch or channel formed within the jaw and is secured in place using securing screws.

End 124 of central member 122 further includes two apertures 126 and 128. As discussed in FIG. 3, and as further illustrated in FIG. 5b below, apertures 126 and 128 permit the insertion of fasteners such as fastening screws 110 and 112 through insert 90 in order to secure a high temperature jaw insert 106 to insert 90. As illustrated in FIG. 4a, apertures 126 and 128 in the preferred embodiment are formed 1 inch apart, and aperture 126 is formed 1 inch from end 124 of central member 122. Additionally, both apertures 126 and 128 are centered in height on central member 122 and, therefore, are 1 inch from both the top and bottom edges of central member 122.

Figure 4B:
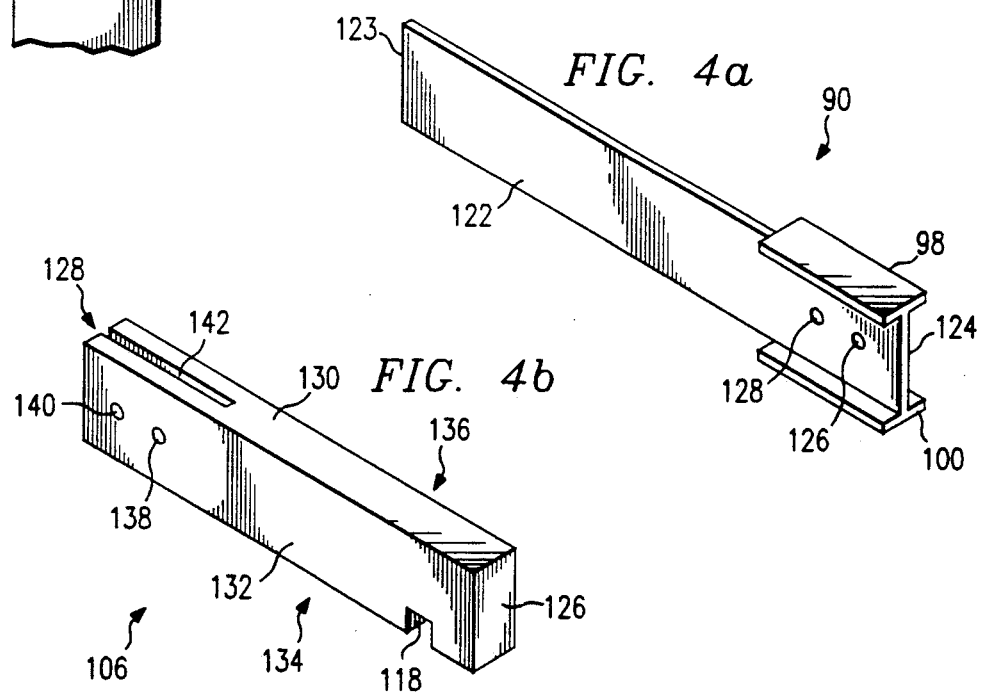

FIG. 4b illustrates an enlarged three dimensional view of high temperature jaw insert 106 shown in FIG. 3, above. High temperature jaw insert 106 is generally hexahedron in shape and, therefore, includes two ends, 126 and 128, as well as four sides, 130, 132, 134 and 136. Again, by way of example and for purposes of illustrating the best mode of the invention, the preferred dimensions of each of the various components of high temperature jaw insert 106 are stated below; however, it should be understood that these dimensions may be modified by one skilled in the art without departing from the scope of the intended invention. Two apertures 138 and 140 are formed proximate end 128 of jaw insert 106. Apertures 138 and 140 are formed through the entire depth of insert 106 and, therefore, extend from side 132 to side 136. As illustrated, aperture 140 is formed 1 inch from end 128, while aperture 138 is formed 1 inch from aperture 140. In addition, both apertures 138 and 140 are centered vertically on side 132 and, therefore, are 1 inch from both the top and bottom edges of side 132. Apertures 138 and 140 communicate with apertures 126 and 128 of central member 122 illustrated in FIG. 4a. Therefore, as illustrated in FIG. 3, fastening elements such as fastening screws 110 and 112 may be inserted into apertures 138 and 140, thereby passing through apertures 126 and 128 and, further, through the opposing apertures (not shown) on side 136 in order to mechanically affix jaw insert 106 to insert 90.

A square groove 142 is formed centrally from end 128 and in side 130. Square groove 142 extends from side 130 to side 134. In particular, square groove 142 is formed as 3 inches deep from end 128 within side 130, and 0.25 inches in width. As a result, it may be appreciated that high temperature jaw insert 106 may be inserted onto end 124 of insert 90 such that square groove 142 receives end 124 within the groove. In addition, it may be appreciated that perpendicular securing plates 98 and 100 further apply a maintaining force to sides 130 and 134 immediately proximate end 128. Thus, upon the insertion of fasteners through apertures 138 and 140, high temperature jaw insert 106 is not only affixed to central member 122, but is maintained in co-alignment with central member 122 and is not permitted to flex vertically with respect to central member 122. As a result, high temperature jaw insert 106 maintains a large amount of vertical strength and, therefore, can support a relatively heavy flange, or other like device.

A square notch 118 is formed in side 132 proximate end 126, and extends throughout the entire width of jaw insert 106, thereby terminating at side 136. As discussed above, square notch 118 is formed in order to retain a device such as flange 12 illustrated in FIGS. 1a and 1b, above. As a result, the particular dimensions of square notch 118 may be varied in order to accommodate one of many different types of flange devices or other preferable workpieces.

From the above, it may be appreciated that the combined structures of insert 90 and high temperature jaw insert 106 provide a convenient and valuable tool by which extremely high temperatures may be implemented in the lathe system. In the preferred embodiment, the combined structures are utilized in order to position a flange immediately proximate a tube in order to butt seal the two separate devices together. One particular advantage of the two component structure is that the high temperature jaw insert 106 may be easily removed by removing the fastening elements from apertures 138 and 140 and pulling insert 106 away from insert 90. Upon removal of insert 106, insert 90 may be used by itself to retain any desired workpiece in a manner similar to that discussed in connection with inserts 56, 58, 60 and 62 illustrated in FIG. 2, above. Thus, in the preferred embodiment where graphite is used as the material to construct high temperature jaw insert 106, that material may be removed for applications of the lathe where such high temperatures are not necessary. As a result, the graphite structure need not always be used and, hence, the longevity of the high temperature jaw insert is increased.

Although the present invention has been described in detail, it should be understood that various substitutions, modifications or alterations could be made to the embodiments described herein without departing from the scope and spirit of the invention as defined by the following claims. For example, rather than having two separable components as illustrated in FIGS. 4a and 4b, a single insert constructed of a high temperature resistant material such as graphite could be constructed for use with the scroll chucks illustrated in FIG. 2. In addition, the applications discussed herein pertain to quartz tubes and flanges, but other high-temperature applications will be equally encompassed and workable with the present invention. Finally, other examples may be readily determined by one skilled in the art, but should not fall beyond the intended scope of the present invention.

What is claimed is:

1. A method of connecting a flange to a cylinder, comprising:
   securing the cylinder in a first chuck of a lathe;
   securing the flange in a second chuck of the lathe;
   rotating the first and second chuck such that the cylinder and flange are rotated;
   bringing an end of the cylinder in proximity of a heating element associated with the lathe contemporaneously with said rotating step;
   bringing the flange in proximity of the heating element contemporaneous with said rotating step; and
   bringing the end of the cylinder in contact with the flange;
   wherein said step of securing the flange comprises securing the flange in a chuck comprising a plurality of retaining members, and wherein each of the plurality of retaining members comprises;
   a first portion comprising graphite, wherein the first portion retains the flange; and
   a second portion comprising steel, wherein the second portion is connected between the first portion and the chuck.

2. The method of claim 1 and further comprising heating the end of the cylinder to a temperature approximating its melting point after said step of bringing the end in proximity of the heating element.

3. The method of claim 1 and further comprising heating a side of the flange to a temperature approximating its melting point after said step of bringing the end in proximity of the heating element.

4. The method of claim 1 and further comprising applying a tool at the end of the cylinder such that the end of the cylinder does not substantially deform in response to the rotation of said rotating step and the heat of the heating element.

5. The method of claim 1 wherein said step of bringing the end of the cylinder in contact with the flange defines an interface at the point of contact between the flange and the end of the cylinder, and further comprising applying a local heat internally within the cylinder and along the interface.

6. The method of claim 1 wherein the heating element produces a predetermined heat, and further comprising adjusting the heating element such that predetermined heat exceeds approximately 1700 degrees Centigrade.

7. The method of claim 1 wherein the cylinder comprises a quartz cylinder.

8. The method of claim 1 wherein the flange comprises a quartz flange.

9. A method of connecting a flange to a cylinder, comprising:
   securing the cylinder in a first chuck of a lathe;
   securing the flange in a second chuck of a lathe;
   rotating the first and second chuck such that the cylinder and flange are rotated;
   adjusting the heat of a heating element associated with the lathe such that the heat exceeds approximately 1700 degrees Centigrade;
   bringing an end of the cylinder in proximity of the heating element contemporaneously with said rotating step;
   bringing the flange in proximity of the heating element contemporaneously with said rotating step;
   heating a side of the flange to a temperature approximating its melting point after said step of bringing the end in proximity of the heating element;
   heating the end of the cylinder to a temperature approximating its melting point after said step of bringing the end in proximity of the heating element; and
   bringing the end of the cylinder in contact with the flange;
   wherein said step of securing the flange comprises securing the flange in a chuck comprising a plurality of retaining members, and wherein each of the plurality of retaining members comprises;
   a first portion comprising graphite, wherein the first portion retains the flange; and
   a second portion comprising steel, wherein the second portion is connected between the first portion and the chuck.

10. The method of claim 9 wherein said step of bring the end of the cylinder in contact with the flange defines an interface at the point of contact between the flange and the end of the cylinder, and further comprising:
   applying a tool at the end of the cylinder such that the end of the cylinder does not substantially deform in response to the rotation of said rotating step and the heat of the heating element; and
   applying a local heat internally within the cylinder along the interface.

11. The method of claim 9 wherein the cylinder comprises a quartz cylinder, and wherein the flange comprises a quartz flange.

12. A chuck for use with a lathe, comprising:
a circular member; and
a plurality of retaining members disposed around said circular member and radially moveable, wherein each of the plurality of retaining members comprises a first portion of material having a melting point in excess of approximately 1700 degrees Centigrade and moveable to retain a workpiece, and wherein each of the plurality of retaining members further comprises a second portion of material connected between said first portion and said circular member, and wherein said first portion comprises a generally hexahedron member having four sides and having a groove formed from a first side to a second side and longitudinally along said hexahedron member such that an end of said second portion may be disposed within said groove.

13. The chuck of claim 12 wherein said first portion of material comprises graphite.

14. A chuck for use with a lathe, comprising:
a circular member; and
a plurality of retaining members disposed around said circular member and radially moveable, wherein each of the plurality of retaining members comprises a first portion of material having a melting point in excess of approximately 1700 degrees Centigrade and moveable to retain a workpiece, and wherein each of the plurality of retaining members further comprises a second portion of material having a melting point less than that of said first portion of material, wherein said second portion is connected between said first portion and said circular member.

15. The chuck of claim 12 wherein said second portion has at least two apertures formed through said second portion, and wherein said first portion includes at least two apertures formed from a third side to a fourth side of said hexahedron member such that said apertures of said first portion align with said apertures of said second portion when said second portion is disposed within said groove of said first portion, and such that fastening elements may be passed through said apertures for securing said second portion to said first portion.

16. A chuck for use with a lathe, comprising:
a circular member; and
a plurality of retaining members disposed around said circular member and radially moveable, wherein each of the plurality of retaining members comprises a first portion of material having a melting point in excess of approximately 1700 degrees Centigrade and moveable to retain a workpiece, and wherein each of the plurality of retaining members further comprises a second portion of material connected between said first portion and said circular member, wherein said second portion comprises a rectangular member defining a plane, and further comprising two parallel plate members, wherein said plate members are disposed at one end of said rectangular member and are perpendicular to said plane.

17. The chuck of claim 16 wherein said first portion comprises a generally hexahedron member having four sides, and having a groove formed in a first side to a second side and longitudinally along said hexahedron member such that said second portion may be disposed within said groove and in linear alignment with said hexahedron member, and such that said parallel plate members support said hexahedron member such that said hexahedron member is substantially unable to move out of linear alignment with said second portion.

18. A chuck for use with a lathe, comprising:
a circular member; and
a plurality of retaining members disposed around said circular member and radially moveable, wherein each of the plurality of retaining members comprises a first portion of material having a melting point in excess of approximately 1700 degrees Centigrade and moveable to retain a workpiece;
a plurality of jaw members disposed around said circular member and coinciding with said retaining members, and wherein each of the plurality of retaining members further comprises:
a second portion of material having a melting point less than that of said first portion of material, wherein said second portion is connected to said first portion; and
wherein each of said jaw members is movably affixed to said circular member such that said jaw member is radially moveable, and wherein each of said jaw members includes a longitudinal groove extending substantially perpendicular to said circular member, and wherein said second portion is disposed with said groove.

19. The chuck of claim 12 wherein each of said first portions includes a notch shaped to retain the workpiece within said notch.

20. A chuck of claim 19 wherein said workpiece comprises a flange.

21. A chuck for use with a lathe, comprising:
a circular member; and
a plurality of retaining members disposed around said circular member and radially moveable, wherein each of the plurality of retaining members comprises:
a first portion of material having a melting point in excess of approximately 1700 degrees Centigrade and moveable to retain a workpiece, and wherein said first portion comprises a generally hexahedron member having four sides; and
a second portion of material connected between said first portion and said circular member, wherein said second portion comprises a rectangular member defining a plane, and further comprises two parallel plate members, wherein said plate members are disposed at one end of said rectangular member and perpendicular to said plane such that said second portion may be disposed in linear alignment with said hexahedron member, and such that said parallel plate members support said hexahedron member such that said hexahedron member is substantially unable to move out of linear alignment with said second portion.

22. The chuck of claim 21 wherein said first portion of material comprises steel and said second portion of material comprises graphite.

23. The chuck of claim 21 wherein said first portion has a groove formed from a first side to a second side and longitudinally along said hexahedron member such that an end of said second portion may be disposed within said groove.

24. The chuck of claim 23 wherein said second portion has at least two apertures formed through said second portion, and wherein said first portion includes at least two apertures formed from a third side to a fourth side of said hexahedron member such that said apertures of said first portion align with said apertures of said second portion when said second portion is disposed within said groove of said first portion, and such that fastening elements may be passed through said apertures for securing said second portion to said first portion.

25. The chuck of claim 21 and further comprising a plurality of radially moveable jaw members disposed around said circular member and coincidentally with said retaining members, and wherein each of said jaw members includes a longitudinal groove extending substantially perpendicular to said circular member, and wherein said second portion is disposed within said groove.

26. A lathe, comprising:
a table;
a headstock supported by said table and axially connected to a first scroll chuck;
a tailstock supported by said table and axially connected to a second scroll chuck; and
wherein each of said first and second scroll chucks comprise:
  a circular member; and
  a plurality of retaining members disposed around said circular member and radially moveable, wherein each of the plurality of retaining members comprises a first portion of material having a melting point in exces of approximately 1700 degrees Centigrade and moveable to retain a workpiece, and wherein each of the plurality of retaining members further comprises a second portion of material connected between said first portion and said circular member, and wherein said first portion comprises a generally hexahedron member having four sides and having a groove formed from a first side to a second side and longitudinally along said hexahedron member such that an end of said second portion may be disposed within said groove.

27. The lathe of claim 26 wherein said first portion of material comprises graphite.

28. A lathe, comprising:
a table;
a headstock supported by said table and axially connected to a first scroll chuck;
a tailstock supported by said table and axially connected to a second scroll chuck; and
wherein each of said first and second scroll chucks comprise:
  a circular member; and
  a plurality of retaining members disposed around said circular member and radially moveable, wherein each of the plurality of retaining members comprises a first portion of material having a melting point in excess of approximately 1700 degrees Centigrade and moveable to retain a workpiece, and wherein each of the plurality of retaining members further comprises a second portion of material connected between said first portion and said circular member, wherein said second portion comprises a rectangular member defining a plane, and further comprising two parallel plate members, wherein said plate members are disposed at one end of said rectangular member and are perpendicular to said plane.

29. The lathe of claim 28 wherein said first portion comprises a generally hexahedron member having four sides, and having a groove formed in a first side to a second side and longitudinally along said hexahedron member such that said second portion may be disposed within said groove and in linear alignment with said hexahedron member, and such that said parallel plate members support said hexahedron member such that said hexahedron member is substantially unable to move out of linear alignment with said second portion.

30. A lathe, comprising:
a table;
a headstock supported by said table and axially connected to a first scroll chuck;
a tailstock supported by said table and axially connected to a second scroll chuck; and
wherein each of first and second scroll chucks comprise:
  a circular member; and
  a plurality of retaining members disposed around said circular member and radially moveable, wherein each of the plurality of retaining members comprises a first portion of material having a melting point in excess of approximately 1700 degrees Centigrade and moveable to retain a workpiece;
a plurality of jaw members disposed around said circular member and coinciding with said retaining members, and wherein each of the plurality of retaining members further comprises:
a second portion of material having a melting point less than that of said first portion, wherein said second portion is connected to said first portion; and
wherein each of said jaw members is movably affixed to said circular member such that said jaw member is radially moveable, and wherein each of said jaw members includes a longitudinal groove extending substantially perpendicular to said circular member, and wherein said second portion is disposed within said groove.

31. The lathe of claim 26 and wherein said table includes a track formed longitudinally along the table, and further comprising:
a tailstock positioning device coupled between said table and said tailstock and being co-aligned with said track, wherein said tailstock positioning device comprises an adjustable device for moving said tailstock along said track such that said second scroll chuck may be moved toward or away from said first scroll chuck.

32. The lathe of claim 26 and wherein said table includes a track formed longitudinally along the table, and further comprising:
a heating element supported by said table; and
a heating element positioning device coupled between said table and said heating element and being co-aligned with said track, wherein said heating element positioning device comprises an adjustable device for moving said heating element along said track between said first and second scroll chucks.

33. The lathe of claim 32 wherein said heating element comprises a gas burner.

34. The chuck of claim 14 in which said first portion of material is graphite.

35. The chuck of claim 14 in which said second portion of material is steel.

36. The chuck of claim 18 in which said first portion of material is graphite.

37. The chuck of claim 18 in which said second portion of material is steel.

38. The chuck of claim 30 in which said first portion of material is graphite.

39. The chuck of claim 30 in which said second portion of material is steel.

* * * * *